United States Patent [19]
Mackinnon

[11] Patent Number: 6,016,158
[45] Date of Patent: Jan. 18, 2000

[54] OBJECT ORIENTED COMMUNICATION NETWORK

[75] Inventor: Russell D. N. Mackinnon, Knowlton, Canada

[73] Assignee: Pelmorex Media Inc., Mississauga, Canada

[21] Appl. No.: 08/605,140

[22] PCT Filed: Sep. 15, 1994

[86] PCT No.: PCT/CA94/00505

§ 371 Date: Jun. 11, 1996

§ 102(e) Date: Jun. 11, 1996

[87] PCT Pub. No.: WO95/08226

PCT Pub. Date: Mar. 23, 1995

[30] Foreign Application Priority Data

Sep. 15, 1993 [CA] Canada .................................. 2106222

[51] Int. Cl.[7] .................................................. H04N 7/10
[52] U.S. Cl. ................................... 348/7; 348/6; 348/10
[58] Field of Search ............................... 348/3, 6, 7, 8, 348/10, 460, 461, 463, 465, 467, 468, 473, 722, 731; 455/3.1, 4.2, 5.1; H04N 7/10

[56] References Cited

U.S. PATENT DOCUMENTS

| | | | |
|---|---|---|---|
| 5,115,310 | 5/1992 | Takano et al. | 348/722 |
| 5,152,011 | 9/1992 | Schwob | 348/731 |
| 5,247,575 | 9/1993 | Sprague et al. | 348/3 |
| 5,345,594 | 9/1994 | Tsuda | 348/6 |
| 5,404,505 | 4/1995 | Levinson | 348/3 |
| 5,619,249 | 4/1997 | Billock et al. | 348/7 |
| 5,659,350 | 8/1997 | Hendricks et al. | 348/6 |

FOREIGN PATENT DOCUMENTS

| | | | |
|---|---|---|---|
| 0 190 837 | 8/1986 | European Pat. Off. | |
| 0 190 837 B1 | 1/1991 | European Pat. Off. | H04N 7/087 |
| 35 27 939 A1 | 2/1987 | Germany | H04N 7/087 |
| 39 09 334 | 9/1990 | Germany | |
| 42 01 031 A1 | 7/1993 | Germany | H04H 1/00 |
| 665 516 | 5/1988 | Switzerland | |
| 2 256 346 | 12/1992 | United Kingdom | |

OTHER PUBLICATIONS

Hans–Jochen Schneider, Lexinkon der Informatik und Daten–verarbeitung (Dictionary of Computer Science and Data–Processing) 1991, pp. 166–167 ("Darstellungsbereich"), p. 569 ("Overlay"), p. 654 ("Rasterbild").

*Primary Examiner*—Brian L. Casler
*Assistant Examiner*—Luanne P. Din
*Attorney, Agent, or Firm*—Bereskin & Parr

[57] ABSTRACT

A communication system comprising: a transmitter having means for transmitting an object stream comprising a plurality of objects; each of said objects having an identifier or ID which is unique in said communication system and which is independent of the time of transmission of said object; a plurality of receivers each including means for receiving said object stream, and each including means for selecting any of said objects from said object stream; means for providing a receiver profile at each of said receivers independently from said object stream transmission, said transmitter having no means for addressing any of said objects to any of said receivers; each of said receiver profiles comprising a list of objects of interest for one of said receivers; said means for selecting being responsive to said profile and said unique ID for selecting objects from said object stream corresponding to objects of interest and for storing said objects of interest; characterized in that said system includes sequencer means for providing a sequence list; said sequence list providing a list of objects of interest which have been stored to be displayed and their respective start times; and means responsive to said sequencer means for assembling, for display as a video signal, said objects on said sequence list, in order of their start times.

11 Claims, 9 Drawing Sheets

| | 150 | 152 | 154 | 158 | 160 | 162 | 164 | 166 |
|---|---|---|---|---|---|---|---|---|
| # DIS | S000:00:00 | 000:00:03 | V1 | R- | O- | C- | 0102 |
| # INC | S000:00:03 | 000:00:10 | MA. SEQ | | | | ←—156 |
| # DIS | S000:00:10 | 000:00:40 | V1 | R- | O- | C- |
| # INC | S000:00:40 | 000:01:40 | MPREV 100AOV.SEQ |
| # DIS | S000:01:40 | 000:01:50 | V1 | R- | O- | C- |
| # DIS | S000:01:50 | 000:03:30 | V1 | R- | O1 | C1 |
| # DIS | S000:03:30 | 000:04:00 | V1 | R- | O- | C- |
| # INC | S000:04:00 | 000:04:15 | MSCROLLEGOBS.SEQ |
| # DIS | S000:04:15 | 000:04:25 | V1 | R- | O- | C- |
| # DIS | S000:04:25 | 000:06:05 | V1 | R- | O1 | C1 |
| # DIS | S000:06:05 | 000:10:45 | V1 | R- | O- | C- |
| # INC | S000:10:45 | 000:11:45 | MPREV 100AOV.SEQ |
| # DIS | S000:11:45 | 000:12:45 | V1 | R- | O- | C- |
| # DIS | S000:12:45 | 000:12:55 | V1 | W |
| # DIS | S000:12:55 | 000:13:50 | V1 | R- | O1 | C1 |
| # DIS | S000:13:50 | 000:14:00 | V1 | R- | O- | C- |
| # DIS | S000:14:00 | 000:14:29 | V1 | R- | O1 | C1 |
| # DIS | S000:14:29 | 000:15:50 | V1 | R- | O- | C- |
| # DIS | S000:15:50 | 000:17:50 | V1 | R- | O1 | C1 |
| # DIS | S000:17:50 | 000:20:03 | V1 | R- | O- | C- |
| # INC | S000:20:03 | 000:20:10 | MA. SEQ |
| # DIS | S000:20:10 | 000:20:40 | V1 | R- | O- | C- |
| # INC | S000:20:40 | 000:21:40 | MPREV 100AOV.SEQ |
| # DIS | S000:21:40 | 000:21:50 | V1 | R- | O- | C- |
| # DIS | S000:21:50 | 000:22:45 | V1 | R- | O1 | C1 |
| # DIS | S000:22:45 | 000:23:30 | V1 | W |
| # DIS | S000:23:30 | 000:24:00 | V1 | R- | O- | C- |

FIG. 9-1

| | | | | | | |
|---|---|---|---|---|---|---|
| # INC | S000:24:00 | 000:24:15 | MSCROLLEGOBS.SEQ | | | |
| # DIS | S000:24:15 | 000:24:25 | V1 | R- | O- | C- |
| # DIS | S000:24:25 | 000:26:05 | V1 | R- | O1 | C1 |
| # DIS | S000:26:05 | 000:29:00 | V1 | R- | O- | C- |
| # INC | S000:29:00 | 000:29:14 | MPOLLEN.SEQ | | | |
| # DIS | S000:29:14 | 000:30:20 | V1 | R- | O- | C- |
| # INC | S000:30:20 | 000:31:20 | MPREV 100AOV.SEQ | | | |
| # DIS | S000:31:20 | 000:32:00 | V1 | R- | O- | C- |
| # DIS | S000:32:00 | 000:33:29 | V1 | R- | O1 | C1 |
| # DIS | S000:33:29 | 000:35:50 | V1 | R- | O- | C- |
| # DIS | S000:35:50 | 000:37:50 | V1 | R- | O1 | C1 |
| # DIS | S000:37:50 | 000:40:03 | V1 | R- | O- | C- |
| # INC | S000:40:03 | 000:40:10 | MA. SEQ | | | |
| # DIS | S000:40:10 | 000:40:40 | V1 | R- | O- | C- |
| # INC | S000:40:40 | 000:41:40 | MPREV 100AOV.SEQ | | | |
| # DIS | S000:41:40 | 000:41:50 | V1 | R- | O- | C- |
| # DIS | S000:41:50 | 000:43:30 | V1 | R- | O1 | C1 |
| # DIS | S000:43:30 | 000:44:00 | V1 | R- | O- | C- |
| # INC | S000:44:00 | 000:44:11 | MSCROLLEGOBS.SEQ | | | |
| # DIS | S000:44:11 | 000:44:15 | RP | | | |
| # DIS | S000:44:15 | 000:44:25 | V1 | W | | |
| # DIS | S000:45:55 | 000:51:15 | V1 | R- | O- | C- |
| # INC | S000:51:15 | 000:52:15 | MPREV 100AOV.SEQ | | | |
| # DIS | S000:52:15 | 000:52:55 | V1 | R- | O- | C- |
| # DIS | S000:52:55 | 000:53:50 | V1 | R- | O1 | C1 |
| # DIS | S000:53:50 | 000:54:00 | V1 | R- | O- | C- |
| # DIS | S000:54:00 | 000:54:29 | V1 | R- | O1 | C1 |
| # DIS | S000:54:29 | 000:55:50 | V1 | R- | O- | C- |
| # DIS | S000:55:50 | 000:57:50 | V1 | R- | O1 | C1 |
| # DIS | S000:57:50 | 000:58:30 | V1 | R- | O- | C- |
| # DIS | S000:58:30 | 000:58:34 | V1 | W | | |

←—77

SEQUENCE LIST

FIG. 9-2

```
; MPREV100ACV.SEQ
;
# DIS    S000:00:00    000:00:12    V1    RT    01    C1
# DIS    S000:00:12    000:00:24    V1    RT          PTYS$StS2PCPL1_MM
# DIS    S000:00:24    000:00:36    V1    RT          PTYS$StS3PCPL1_MM
# DIS    S000:00:36    000:00:48    V1    RT          PTYS$StSYSNSN1_MM
# DIS    S000:00:48    000:00:56    V1    RT    O-    C-  PTYS$StSYSLSL1
# DIS    S000:00:56    000:01:00          RP          PTYS$StS1PCPL1_MM
                    SEQUENCE FILE INCLUDED IN SEQUENCE LIST (FIG. 9)
```

FIG. 10

```
; THIS FILE IS A PORTION OF THE PRODUCT DEFINITION FILE
00     0000          ...    "UN MOMENT S.V.P."
01     SL000.TGA     ...    LOGO MM              ←— 168
02     SL001.TGA     ...    "UN MOMENT S.V.P."

00     0100          ...    OBSERVATIONS AUTOMATIQUES
01     SL011.TGA     ...    FOND OPAQUE 3 ZONES
01     SL101.TGA     ...
01     SL201.TGA     ...                         ←— 170
01     SL253.TGA     ...
01     SL300.TGA     ...

00     0101          ...    OBSERVATIONS MANUELLES
01     SL011.TGA     ...    FOND OPAQUE 3 ZONES
01     SL211.TGA     ...                         ←— 172
01     SL311.TGA     ...

00     0102          ...    CONDITIONS LOCALES -    PAGE 1
01     SL231.TGA     ...    FOND OPAQUE 3 ZONES
01     SL202.TGA     ...
01     SL302.TGA     ...                         ←— 174
01     SL322.TGA     ...
01     SL324.TGA     ...

00     0203          ...    CONDITIONS LOCALES -    PAGE 2
01     SL233.TGA     ...    FOND OPAQUE 3 ZONES
01     SL234.TGA     ...                         ←— 176
01     SL235.TGA     ...

00     0404          ...    CONDITIONS LOCALES -    PAGE 3
01     SL232.TGA     ...    FOND OPAQUE 3 ZONES
01     SL444.TGA     ...                         ←— 178
01     SL445.TGA     ...

00     0511          ...    STATISTIQUES
01     SL551.TGA     ...    FOND OPAQUE 3 ZONES
01     SL552.TGA     ...                         ←— 180

00     0606          ...    PHASES DE LA LUNE
01-    SL611.TGA     ...    FOND OPAQUE 3 ZONES  ←— 182
; NOTE: THE DOTS "..." INDICATE TECHNICAL PARAMETERS
```

FIG. 11

OBJECT ORIENTED COMMUNICATION NETWORK

FIELD OF THE INVENTION

This invention relates to a communication system. More particularly, the present invention relates to a non-hierarchial network in which receivers are responsive to data objects which are broadcast network wide.

BACKGROUND OF THE INVENTION

In the prior art, there are communications systems for supplying video, audio and data to affiliated receivers in a network for broadcast or display.

These known systems usually comprise some form of addressing to identify the destination, i.e. receiver, for the video, audio or data transmission. The addressing scheme produces a single to multi-point network in which communication is provided between a transmitter and one or more receivers.

These known systems have drawbacks. By its very nature, the addressing scheme requires that the transmitter must know the addresses of all the receivers. This implies that the transmitter must have considerable intelligence or processing power. In addition, each receiver must also include sufficient processing power to identify and decode transmissions which are addressed to it. Furthermore, the capacity of the systems is dependent on the addressing scheme. Each additional receiver will be seen by the transmitter as an additional address which must be serviced.

Certain systems are also known which do not require addressing. In particular, EP, A, O 190 837 (THORN EMI FERGUSON LTD.) published Aug. 13, 1986 discloses a teletext display system in which, to reduce storage capacity and to speed updating, each teletext page contains an identification or ID code, and each receiver has a local interest list which is created based on those pages which are selected most frequently by the user. If a page with an ID on the interest list is received, it is stored so that it can be more rapidly displayed. The pages of interest are then displayed on user request.

Similarly, CH, A, 665 516 (MARCEL MÜLLER) granted May 13, 1988 discloses a system in which no addressing is required, but rather in which each transmitter transmits a data sequence (e.g. weather reports) from various regions, each report having an ID associated with it. Each receiver can store only a small part of the data stream and chooses reports to store by a local interest list entered by the user on its own keyboard. Stored objects are displayed on request by the user.

Neither of these systems discloses an automated communication system in which a central transmitter can transmit objects to a plurality of receivers, without the need for point-to-point addressing, and in which each receiver can select objects and then automatically retransmit them at desired times and in a desired sequence (usually for display on a customer's television set or the like).

BRIEF SUMMARY OF THE INVENTION

A feature of the present invention is that the receivers process data independent of the transmitter. The system does not require the transmitter to address any of the receivers. Instead, the transmitter broadcasts a stream of objects and each receiver selects any object according to a local profile, and stores the selected objects. Each receiver then retransmits the stored objects in a desired sequence at specifically selected times.

It is another feature of the present invention that the receivers can provide a number of different services.

A communication system comprising: a transmitter having means for transmitting an object stream comprising a plurality of objects; each of said objects having an identifier or ID which is unique in said communication system and which is independent of the time of transmission of said object; a plurality of receivers each including means for receiving said object stream, and each including means for selecting any of said objects from said object stream; means for providing a receiver profile at each of said receivers independently from said object stream transmission, said transmitter having no means for addressing any of said objects to any of said receivers; each of said receiver profiles comprising a list of objects of interest for one of said receivers; said means for selecting being responsive to said profile and said unique ID for selecting objects from said object stream corresponding to objects of interest and for storing said objects of interest; characterized in that said system includes sequencer means for providing a sequence list; said sequence list providing a list of objects of interest which have been stored to be displayed and their respective start times; and means responsive to said sequencer means for assembling, for display as a video signal, said objects on said sequence list, in order of their start times.

BRIEF DESCRIPTION OF THE DRAWINGS

For a better understanding of the present invention, and to show more clearly how it may be carried into effect, reference will now be made, by way of example, to preferred embodiments of the present invention shown in the accompanying drawings in which:

FIG. 9 is a partial listing of an exemplary Sequence List according to the invention;

FIG. 10 shows an example "include" file for the Sequence List of FIG. 9; and

FIG. 11 shows an exemplary Product Definition according to the invention.

DETAILED DESCRIPTION OF THE PREFERRED EMBODIMENTS

Figure 1:
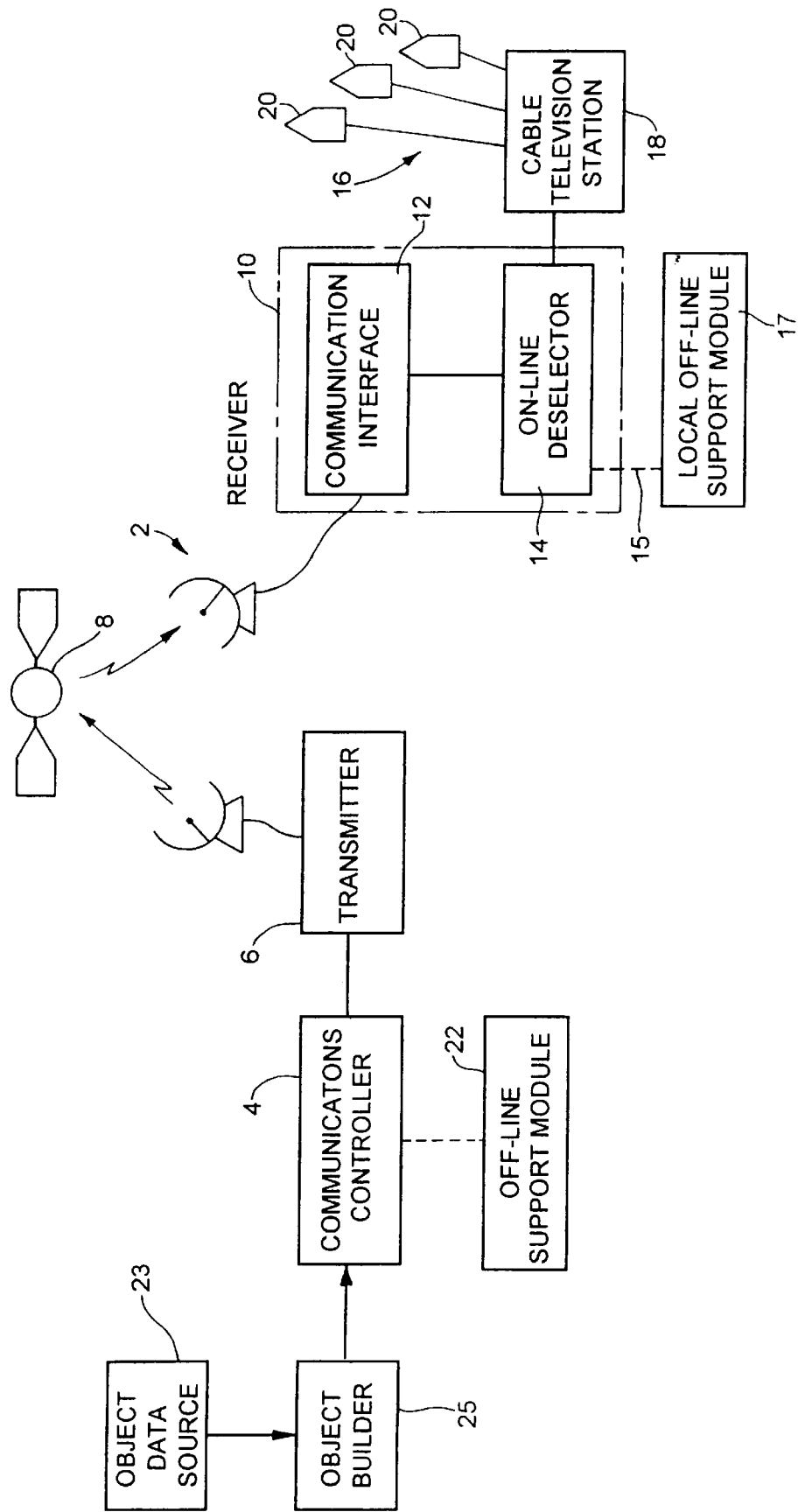
FIG. 1 shows in block diagram form a communication system according to the present invention.

Reference is first made to FIG. 1 which shows in block diagram form an overview of a communication system 2 according to the present invention. The communication system 2 comprises a communication controller 4, a transmitter 6, a communication channel 8, and a receiver 10 which comprises a communication interface 12 and an on-line de-selector 14.

The communication controller 4 comprises a computer which is coupled to the transmitter 6. The function of the communication controller 4 is to transmit data objects to the receivers 10. For the purposes of the following description, and by way of example only, the receiver 10 is coupled to a cable television network 16. As shown in FIG. 1, the cable television network 16 comprises a cable television station 18 and cable television subscribers 20 (e.g. households). In the context of a cable television network, the cable television station 18 is a client or user of services which are made available through the communication network 2. As will be described in detail, the communication network 2 according to the present invention can be used to provide a number of different services, such as weather forecast, stock market reporting, and headline news for example. The cable television station 18 obtains access to these services through the receiver 10 and retransmits the service(s) to the subscribers 20 or households.

In contrast to known systems, the communication controller 4 does not use an addressing scheme, instead the objects are broadcast into space and the receivers 10 accept the data, but only process data objects based on their individual requirements or interests. As will be described in below, an object can comprise digital or computer images, and textual data, related, but not limited to, for example weather, financial or headline news, and the information is transmitted as a stream of data objects. (In addition, as will be described, a live video feed signal and audio signal feed can be incorporated into the service which is provided by the receiver 10.) Each receiver 10 has a profile/scheduler which specifies the objects which are of interest to the receiver 10. The receiver 10 uses its profile/scheduler to "de-select" objects which are of interest to it from the continuous stream of objects existing in space. Because each receiver 10 includes the means for determining which objects it is interested in, the communication controller 4 needs to know very little about the receiver 10, for example, the address or location of each receiver 10 is not required. It will be appreciated by those skilled in the art that this can simplify the design of the communication network.

As shown in FIG. 1, the communication controller 4 can include an off-line support module 22. Because the system 2 according to the present invention provides an open network architecture, i.e. receivers 10 existing in space without addresses, the controller 4 need not know much about the receivers 10. The primary task of the controller 4 is providing objects based on the interests of the users or clients (e.g. the cable television station 18) of the system 2. Therefore, the support module 22 can comprise one or more databases for storing client information and lists of objects for management and inventory purposes. The objects themselves are supplied by an object source 23 and put into a form for transmission (e.g. TIFF format) by an object builder 25 which is coupled to the communication controller 4.

Referring still to FIG. 1, the transmitter 6 comprises communication equipment which is coupled to the controller 4. The transmitter 6 provides the interface between the controller 4 and the communication channel 8. The transmitter 6 formats the data objects according to the standard and protocol utilized by the communication channel 8. In the preferred embodiment of the present invention, the communication channel 8 comprises a satellite system. To communicate with the receivers 10, the satellite (communication system 8) uses a signalling channel comprising a baseband signal (which provides the video and audio signal feeds) and includes a data sub-carrier, e.g. 512 kiloBaud, for the data objects and another sub-carrier for an audio signal channel.

Each of the receivers 10 includes a front-end or communication interface 12 which is compatible with the satellite communication channel 8. In known manner, the transmitter 6 and the front-end of receiver 10 (i.e. communication interface 12) can comprise existing and commercially available satellite communication equipment specified for a baseband channel having for example, a 256 or 512 kiloBaud data sub-carrier.

While the following describes a satellite based communication channel 8, however it will be appreciated that any other types of communication links can be utilized for example, optical fiber technology or a high serial modem link over telephone lines.

Figure 8:
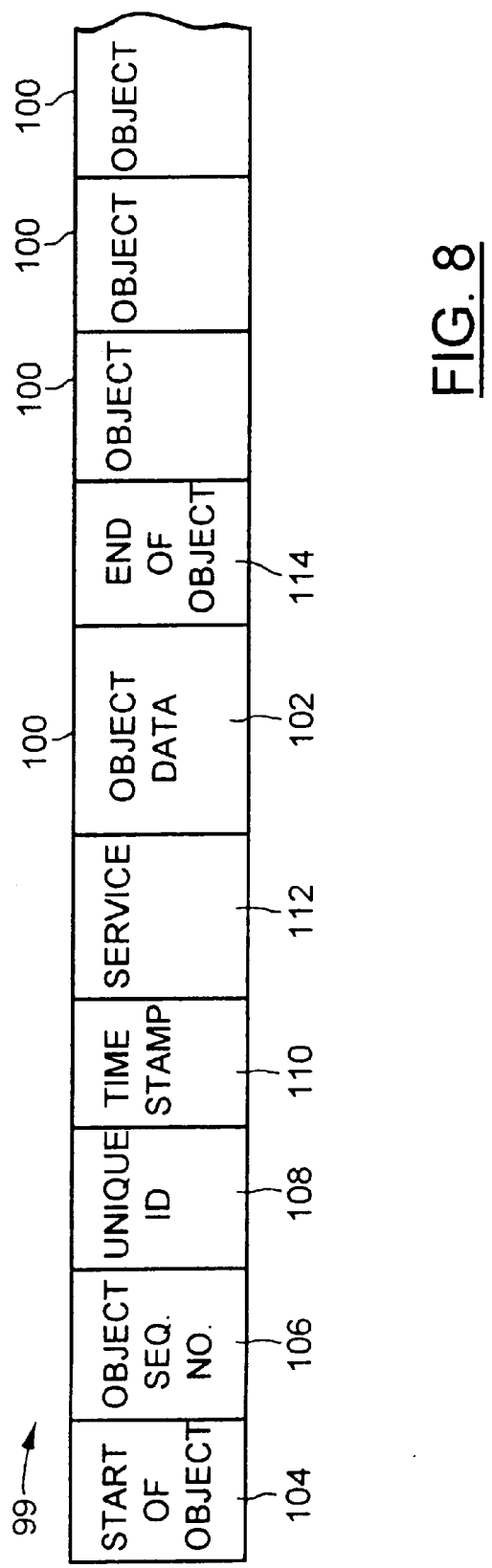
FIG. 8 shows the structure of a stream of data objects which is received by the receiver of FIG. 2.

The communication interface 12 (or front-end) in the receiver 10 provides an interface which is compatible with the transmitter 6, as described above. The interface 12 (in the receiver 10) accepts the incoming satellite signal (baseband video/audio and data sub-carrier) according to the standard and protocol utilized by the transmitter 6 and converts it into a signal level which is compatible with the on-line de-selector 14. The communication interface 12 is coupled to the on-line de-selector 14 and supplies the de-selector 14 with a signal comprising a stream of data objects 99 (FIG. 8). The incoming signal represents a stream of data objects which are received by all the receivers 10, but processed according to the interests of each receiver 10, as will now be described in detail.

Reference is next made to FIG. 8 which shows the organization of a stream of data objects 99. As shown, the stream 99 comprises a series of data objects denoted generally by reference 100. Each object 100 comprises an object data portion 102 which contains data or information related to the service being provided, for example, video images for a headline news story. In addition to the data portion 102, the object 100 includes a start of object field 104, an object sequence number 106, an object identifier field 108 which comprises a Unique ID, a time stamp field 110, and an associated service field 112, and an end of object field 114.

The start of object field 104, the end of object field 114 and the object sequence number 106 are part of the overhead information required to transmit and receive the object 100 as will be understood by one skilled in the art. The start of object and end of object fields 104,114 define the start and end of a data object 100, and can include error detection information such as a checksum or CRC code.

There may be instances where the information being transmitted, e.g. news video images, exceed the capacity of the object data portion 102. In such cases the object data 102 can be transmitted as a sequence of objects 100 and the object sequence number field 106 is used to define the object number in the sequence.

Referring still to FIG. 8, the Unique ID field 108 contains a name or identifier which allows the object 100 to be identified by the receiver 10 and selected if the object 100 is of interest as determined by the profile (see below). Because the data portion 102 defines what the object is, the Unique ID field 108 can simply contain a generic name to identify the object 100. This feature also allows the system 2 to use a single stream 99 to provide many different types of services, e.g. weather forecasting and headline news.

The time stamp field 110 is included because certain types of objects, e.g. weather forecast, can become obsolete after a certain time. The time stamp field 110 comprises date and time of day information that indicates when the object 100 was created. The time stamp 110 can be assigned by the object builder 25 (FIG. 1). As will be described below, the receiver 10 can use the time field 110 as a criterion for selecting objects 100 from the stream of objects 99. For example, an older object 100 can be replaced by a newer object, as determined by the time stamp 110.

Referring again to FIG. 8, the associated service field 112 identifies the service with which the object is associated, for example, a headline news service or a stock market service.

Figure 6:
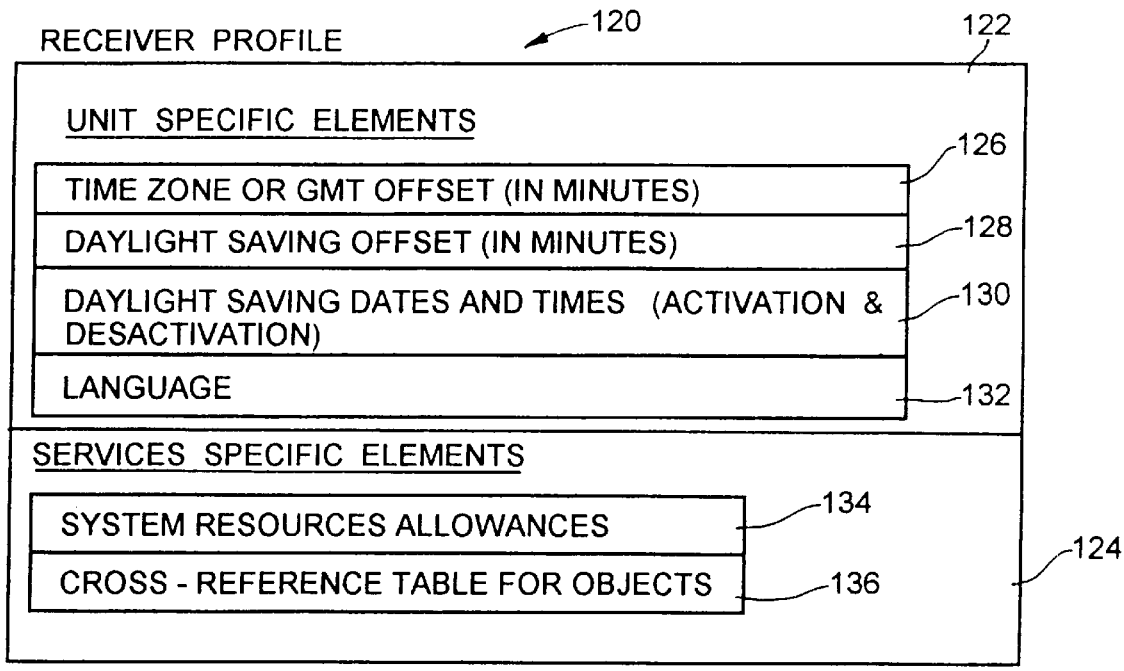
FIG. 6 illustrates an exemplary profile which is used by the system of FIG. 1.

As introduced above, the receiver 10 uses its profile/scheduler to "deselect" objects 100 (FIG. 8) which are of interest to it from the continuous stream of objects 99 existing in space. An exemplary profile 120 is shown in FIG. 6. The profile 120 is a record for the receiver 10 which contains specific information 122 and service specific information 124. The profile 120 can reside on a diskette (not shown) or be burned into an EPROM (not shown) which is read by the receiver 10. Alternatively the profile 120 can be entered into memory in the receiver 10 via a serial port connection 15 which couples the receiver 10 to a local off-line support module 17 (FIG. 1). The primary function of the off-line support module 17 is to give the cable station 18 the capability to modify or augment the profile 120.

The principle function of the profile 120 is to provide the receiver 10 with information so that the receiver 10 can determine which objects 100 in the stream of objects 99 are of interest to it and therefore should be selected from the stream 99. The profile 120 is originally generated by compiling the interests of a cable television station 18, for example by completing a questionnaire. The interests are then compiled into a profile 120 for that station. The profile 120 is then forwarded to the station 18, in the form of diskette for example, and installed in the receiver 10.

As shown in FIG. 6, the receiver 10 specific information comprises a time zone designation 126, a daylight saving offset designation 128, a daylight saving date and time zone designation 130, and a language designation 132.

The information in the daylight saving date designation 130 is used by the receiver 10 to determine when to activate/deactivate daylight savings time.

As described above, the objects 100 in the stream 99 can have more than one language. The receiver 10 uses its language designation 132 to determine its language, i.e. the language of objects that it is interested in. For example, a French designated receiver 10 will only select those objects 100 which have an object identifier 108 which implicitly signifies an object in the French language.

Referring still to FIG. 6, the service specific information 124 comprises two general types of elements: system resource allowances 134 and an object cross-reference table 136. The receiver 10 uses the system resource allowances information 134 to configure its resources for the service to be provided, e.g. memory allocation. The object cross-reference table 136, on the other hand, lists the objects that are associated with a service, provides the selection criteria by which the receiver 10 will select the objects 100 from the object stream 99 (FIG. 8), and also provides a local or Internal ID for use by the receiver 10.

Figure 7:
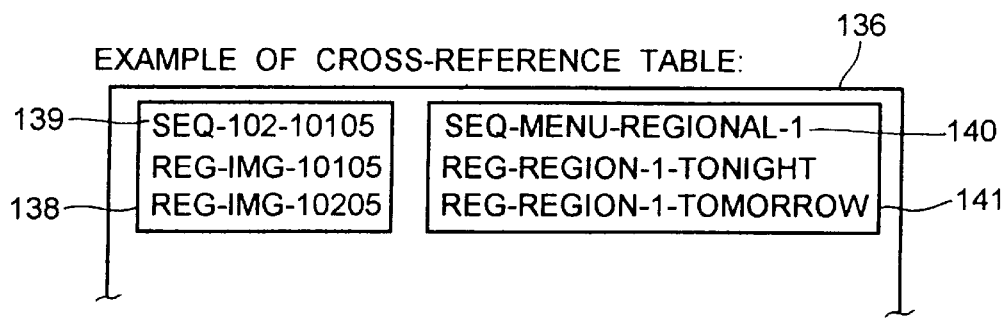
FIG. 7 illustrates an exemplary cross-reference table for the profile of FIG. 6.

In the receiver 10, the objects 100 can be identified according to their Unique ID 139 contained in field 108 (FIG. 8) of the packet 100. The objects 100 can also be renamed with a corresponding Internal ID 140 which is contained in the object cross-reference table 136 as shown in FIG. 7. The cross-reference table 136 is preferred because it provides an "anti-collision" feature which is described below.

The cross-reference table 136 shown in FIG. 7 comprises a list of "Unique ID" object identifiers 138 which are unique to the entire communication network. The cross-reference table 136 also includes a list of "Internal ID" object identifiers 141 for use in the receiver 10. The receiver 10 uses the Unique ID 139 to identify objects which are of interest to it. An object of interest is retained by the receiver 10 and then renamed according to the corresponding Internal ID 140. By renaming the object internally, the receiver 10 can avoid overwriting the object with a newly received object with the same Unique ID 139. Thus, the cross-reference table 136 can provide an "anti-collision" function. The cross-reference table 136 can also be used to maintain compatibility between older versions of receivers 10.

As described above with reference to FIG. 6, the service specific portion 124 of the profile 120 defines a "list of objects" which are of interest to the receiver 10. In the alternative, the "list of objects" can be determined or calculated according to an algorithm in the receiver 10. For example, the algorithm can operate on data taken from the unit specific information 122 or a play-list for the receiver 10. According to this embodiment of the invention, the algorithm produces a list of objects which are of interest to the receiver 10 thereby the receiver 10 the capability to determine its own profile 120.

Figure 2:
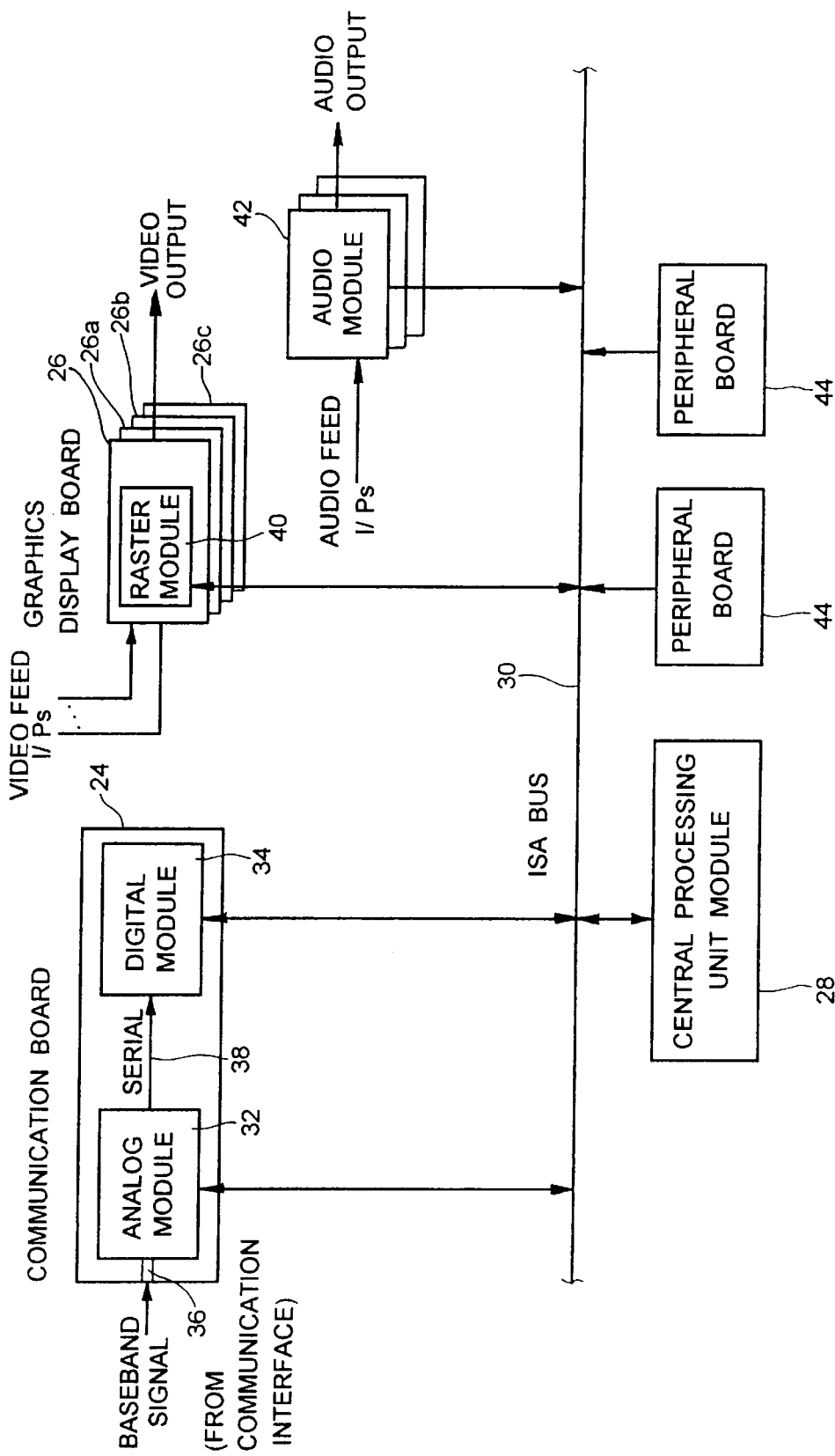
FIG. 2 is a detailed block diagram of a receiver for the system shown in FIG. 1.

Reference is next made to FIG. 2 which shows the structure of the on-line deselector 14. The on-line de-selector 14 comprises a communication board 24 and a graphics display board 26 which are coupled to a central processing unit module 28 through a bus 30. The on-line deselector 14 is based on the well-known ISA or PC-AT (trademark) bus architecture. The central processing unit 28 executes an application program which controls the operation of the on-line de-selector 14. In the preferred embodiment, the central processing unit 28 module comprises an Intel 286/386/486 or Pentium (trademark) type microprocessor, a clock with battery backup, random access memory (1 megabyte minimum), and read only memory (not shown). The central processing module 28 can include other resources, such as a DMA (Direct Memory Access) controller (not shown).

The role of the communication board 24 is to extract objects 100 from the incoming data object stream 99 (FIG. 7) which are of interest to the receiver 10. The function of the display board 26 is to display the objects which have been selected from the object stream by the communication board 24. The objects 100 are extracted according to the profile 120 which defines the interests of the receiver 10 (see FIG. 6). The interests of the receiver 10, in turn, are determined by the client or user, e.g. the services that the cable television station 18 will provide its subscribers 20. Because the receiver 10 knows what objects it wants, the central communication controller 4 does not need to know this, and therefore the need for addressing the receivers 10 for selected data transfer is eliminated.

As shown in FIG. 2, the communication board 24 comprises a digital module 34. The digital module 34 is coupled to an integrated receiver demodulator 32 which is located upstream of the on-line de-selector 14, for example in the communication interface 12. The function of the IRD module 32 is to descramble the incoming baseband signal from the receiver 10 and apply error detection and correction to the incoming signal. The IRD module 32 demodulates and decompresses the baseband video signal, the audio sub-carrier and the data sub-carrier to recover the data object stream 99 (FIG. 8). Once the data sub-carrier has been demodulated, the module 32 can apply known error detection and correction techniques. The IRD module 32 includes a data output 38 which is coupled to the digital module 34 and supplies serial digital data, e.g. the object stream 99. The IRD module 32 also includes an audio feed output 36 and a video feed output 37. The implementation of the IRD module 32 is within the understanding of those skilled in the art and comprises a known product which is available from Scientific Atlanta for example.

As described above, the digital module 34 receives and processes a serial digital feed 38. The digital module 34 can implemented using the known HDLC/SDLC communication protocol and error correction techniques and the Intel 82530 family of communication processor.

In known manner, the IRD module 32 can be packaged on an AT-style board which plugs into a slot on the ISA bus. If the communication channel 8 is not a satellite link, then the IRD module 32 can be replaced according to the communication protocol being used, for example, a high speed serial digital stream over an optical fiber link.

Referring still to FIG. 2, the primary function of the digital module 34 is to extract or deselect objects 100 from the received object stream 99 based on the particular interests (i.e. profile 120) of the receiver 10. This function is implemented in the form of a computer program which is described below. The digital module 34 also provides buffering for the demodulated data objects.

The digital module 34 can be located on another AT-style board. Partitioning the IRD module 32 and the digital module 34 allows the IRD or analog module 32 to be changed (e.g. for a different communication interface) without changing the digital module 34. Communication between the IRD and digital modules 32,34 is accomplished through the serial link 38 as shown in FIG. 2. Alternatively, the digital module 34 can be implemented as a software function in the computer program which is executed by the central processing unit 28.

As shown in FIG. 2, the display board 26 is also coupled to the ISA bus 30. The function of the display board 26 is to provide the objects that have been selected by the digital module 34 in a form (e.g. as cable television video signals) which is suitable for consumption by the user or client (e.g. cable television station 18). If the data portion 102 of the objects 100 are transmitted in a compressed format (e.g. TIFF—Tagged Image File Format using packed bit compression), the objects must be decompressed.

The display board 26 includes a raster module 40. The raster module 40 includes memory which is used to store and process objects containing video images. According to the invention, there are two planes of raster memory: the main raster having at least two pages; and the overlay plane. The display board 26 processes its own Vertical Blanking Interval (VBI) interrupt. The display board 40 preferably has the following functionality: (a) 256/32768 colour display; (b) display resolution of 640×480 for NTSC based television systems; (c) 768×576 display resolution for PAL based television systems; (d) a text function; (e) switching between three video inputs (i.e. video signal feed, computer image or video feed signal overlaid with a computer image); (f) overlaying of the video feed signal with a computer image; (g) decompressing images, e.g. RLE or LZW; and (h) display of time of day clock. This functionality can be provided using known technology as will be within the understanding of one skilled in the art. The display board 26 can also be packaged on an AT-style board which plugs into the ISA bus 30 and runs under the control of the central processing unit 28.

The on-line de-selector 14 also includes an audio module 42 which is used to process objects having audio information. The audio module 42 preferably includes the capability to switch between audio inputs, for example, the audio feed 36 provided by the IRD module 32 and a local audio feed.

Referring still to FIG. 2, the processing resources of the on-line deselector can be augmented by peripheral boards 44. The peripheral boards 44 which plug into the ISA bus 30 can comprise additional memory (e.g. RAM and/or Flash Disk) to increase the capacity of the receiver 10, or a fax/modem board for example.

Figure 3:
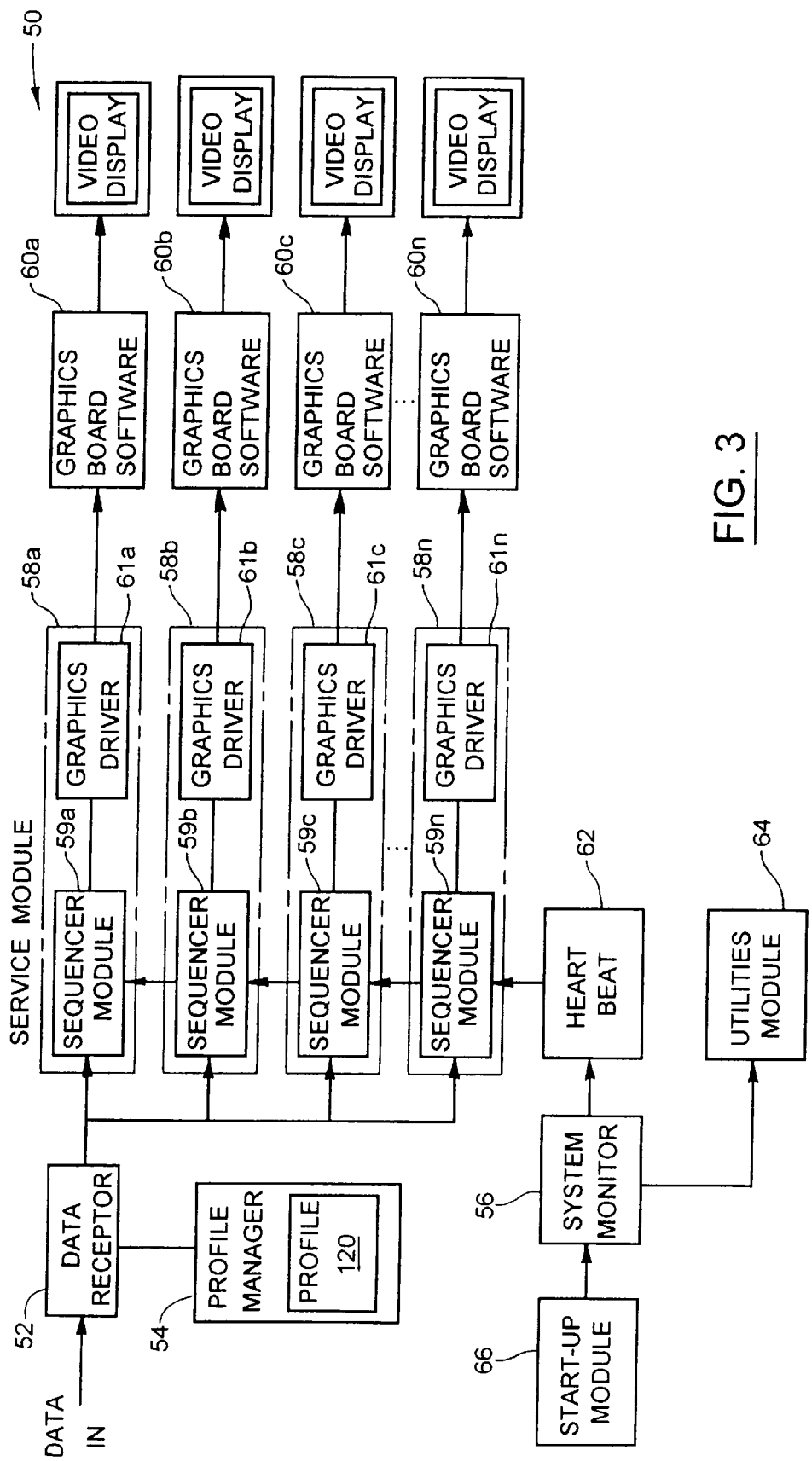
FIG. 3 is a functional block diagram showing the primary components of a computer program which controls the operation of the receiver of FIG. 2.

Reference is next made to FIG. 3 which shows in functional block diagram form an application program 50 executed by the receiver 10 according to the present invention. The application program 50 is based on a micro-kernel real-time operating system for example the commercially available QNX (trademark) system known to one skilled in the art. The program 50 comprises a number of tasks running simultaneously under different priorities. As shown in FIG. 3, the application program 50 comprises seven functional modules: a data receptor module 52; a profile manager 54; a system monitor module 56; a series of service modules 58a to 58n; a series of graphic board software modules 60a to 60n; a "heartbeat" module 62; a utilities module 64 and a start-up module 66.

Referring to FIG. 3, the system monitor 56 comprises a set of functions which manage the operation of the program 50, such as the queuing of tasks performed by the various modules described below.

The heartbeat module 62 synchronizes the receiver 10. According to the invention, the receivers 10 in the system 2 are not under real time control of the communication controller 4, however, the communication controller 4 sends a heartbeat packet periodically which is used by the receivers 10 to synchronize. The heartbeat packet indicates what the Greenwich Mean Time (GMT) will be at the next vertical blanking interval (VBI). Each receiver 10 receives the GMT update and converts it to local time according to its geographic location which can be determined from the profile 120. The program 50 can use the local time to produce a time of day display for the overlay plane.

The utilities module 64 provides a series of utility tasks and drivers. For example, the utilities module 64 can include a self-diagnostics function and the software interface for the off-line support module 17 (FIG. 2), or the software interface for supporting a fax modem board.

The data receptor module 52 processes the incoming object data stream 99 (FIG. 8). The data receptor module 52 serves as the interface to the communication processor 24 (FIG. 2). The data receptor module 52 controls the operation of the digital module 34 (FIG. 2) to perform the following operations: (a) assembling objects (e.g. a video image corresponding to an object may be transmitted in a sequence of packets); (b) buffering the objects for the display processor 26 (FIG. 2); and (c) routing, i.e. dispatching, the objects to the appropriate display processor 26 (FIG. 2). As shown in FIG. 3, the data receptor 52 is coupled to the profile manager 54 which provides access to the profile 120 in order to select and assemble the objects of interest to the receiver 10. The data receptor module 52 is shown in more detail in FIG. 4 and described below.

Referring to FIG. 3, the start-up module 66 initializes the receiver 10 when power is first applied or if there is a reset, either hardware or software. The receiver 10 uses the start-up module 66 to "boot" from an electronic storage device, e.g. floppy or hard disk drive, which contains all the required software and data, e.g. program 50 and profile 120, to initialize the receiver 10.

Once the receiver 10 is initialized, the program 50, i.e. data receptor 52, waits for the object stream 99 to be broadcast by the communication controller 4 and transmitter 6. The communication controller 4 broadcasts the object stream 99 to all the receivers 10 in the system 2. Each receiver 10 receives the object stream 99 and then decides which objects 100 are of use or interest to it. The program 50 then uses one of the service modules 58a to 58n to display the objects of interest e.g. weather service or headline new service.

Referring to FIG. 3, each of the services modules 58a to 58n comprises a sequencer 59a to 59n and a graphics driver 61a to 61n. The sequencer module 59a to 59n is a software function which displays the objects stored by the data receptor 52 according to a "play or sequence list". The sequence-list defines the objects to be displayed and their respective start times. FIG. 9 shows a partial sequence list and is described below.

The graphics driver module 61a to 61n provides an interface between the sequencer 59a to 59n and the graphics board software 60a to 60n. In its simplest form, the graphics driver module 61a generates the "handshaking" required for passing object data to the graphics board 26 (FIG. 2) for video display.

Figure 4:
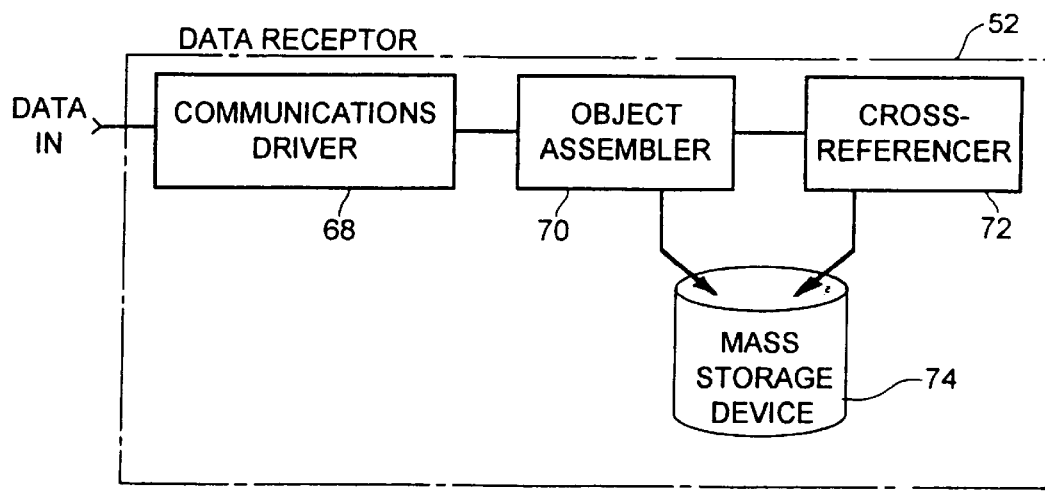
FIG. 4 is a functional block diagram which shows the details of a data receptor module for the program of FIG. 3.

Referring next to FIG. 4, the data receptor module 52 comprises a communications driver 68, an object assembler 70 and a cross-referencer 72. The communications driver 68 provides the interface to the object data stream 99 which is inputted by the communications board 26. The communications driver 68 allows the receiver 10 to be independent from the form of the communication channel or medium 8. The communications driver 68 can be implemented based on known communication protocols, such as SDLC/HDLC protocol using an Intel 82530 communication chip (not shown) operating at 256 (or 512) KiloBaud or a serial communication protocol operating at 19.2 KiloBaud. The primary functions performed by the communication driver 68 are to receive each frame or packet in the object stream 99; to detect errors in the received frame or packet; and if possible replace any corrupted frames. Once a complete packet 99 is received, the communication driver 68 forwards it to the next task, i.e. the object assembler 70.

The primary function of the object assembler 70 is to either "flush" or keep the data block in the data stream 99 comprising the object 100. If the object is of interest to the particular receiver 10, then the data block is written to a mass storage device 74, e.g. a hard disk, which comprises an "object repository". If the object 100 is not of interest, the object assembler 70 "flushes" the data block. The object assembler 70 uses the profile manager 54 to access the Profile 120 (FIG. 6) which is stored locally to determine if an object is of interest. The Profile 120 contains a list of Object ID's which are of interest. Because the objects are transmitted to all the receivers 10 in the field, every piece of information comprises an object with a Unique ID. The object assembler 70 only looks at the Unique ID of the object 100 and is not concerned with the content of the object, therefore the object can comprise any type of file.

Objects 100 which are of interest to the receiver 10 are renamed with an Internal ID 140 (FIG. 7) from the cross-referencer 72. The Internal ID is used as a collision avoidance function to ensure that an object which is received does not overwrite or replace an object which is currently being displayed. To this end, the principal functions performed by the cross-referencer 70 are to rename the object from its Unique ID to its Internal ID; to ensure that there is no overlap between Internal ID assignments (i.e. "internal collisions"); and to send notification of Internal ID assignment to any other functions as required. The cross-referencer 70 accesses the cross-reference table 136 as shown in FIG. 7.

The object repository on the mass storage device 74 comprises a directory which is used to access the objects that have been selected by the receiver 10. The directory is part of a file system which lists the objects that were selected by the data receptor 52 (see above). In the structure of the directory and file system is implemented according to the real time operating system (see above), for example, QNX (trademark) platform.

Figure 5:
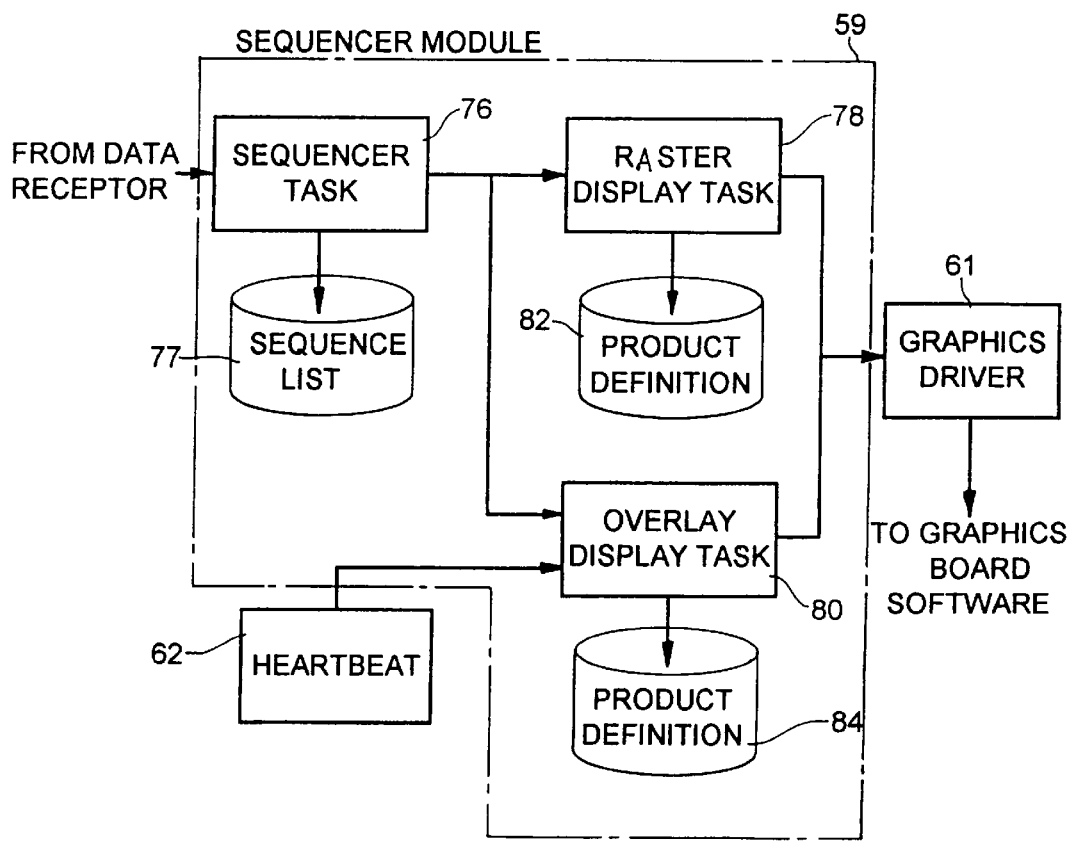
FIG. 5 is a functional block diagram which shows the details of a sequencer module for the program of FIG. 3.

Reference is next made to FIG. 5 which shows the sequencer module 59 in more detail. The sequencer module 59 is a function which operates on the objects 100 in order to produce a service which has been requested by the user or client, e.g. the cable television station 18 and related to the service provider 58. For example, there can be a service provider 58a for a headline news service, a service provider 58b for the financial markets, a service provider 58c for sports headline, and a service provider for weather reports 58n. If the client has subscribed to a headline news service, the sequencer module 59a will perform the tasks required to display headline new stories. These tasks can involve displaying video images accompanied by audio to report the news, for example. In addition, a text message crawling along the bottom of the image can also be provided. The service to be provided defines the type of video images and the audio information which are produced by the receiver 10, and the objects associated with a service define the content of the video images and audio information.

A feature of the system 2 according to the present invention is that the object driven receivers 10 combined with the service modules 58a to 58n allow the receiver 10 to distribute many services from a single source.

As shown in FIG. 5, the sequencer module 59 comprises a sequencer task 76, a raster display task 78, and an overlay display task 80. The sequencer 76 is a function which displays the stored objects according to a sequence-list 77. The function of the sequencer 76 is to assemble (and display) the objects 100 stored in the object repository 74 according to the sequence-list or play-list 77.

As shown in FIG. 9, the sequence-list 77 defines the data, i.e. objects 100, to be displayed for a service, e.g. headline news, and their respective start times. Each operation in the sequence list 77 either comprises an"#include" command or a "#display" command according to the QNX platform. The sequencer 76 uses #include command to include or retrieve another file and the #display command to display data. As shown in FIG. 9, each entry in the sequence list 77 includes a command field 150, a start time 152, an end time 154 and a parameter field 156. The command field 150 specifies whether the entry is an #include or a #display command. The sequences are coded as using a count of seconds starting Sunday morning at 000:00:00 for example. As described above, the heartbeat packet synchronizes the receiver 10 with the communication controller 4. To execute an entry in the sequencer list 77, the sequence 76 compares the start and end time fields 152,154 to the current time in the receiver 10 and executes the entry if the current time is within the defined range. If synchronization is lost, then the sequencer 76 executes a default sequence until synchronization is established.

Because the start and end time fields 152,154 are specified, it is not necessary for the sequencer 76 to open the file and therefore the sequencer 76 can quickly regain synchronization.

The parameter field 156 provides additional parameters which are needed to execute the operation. For example, the parameter field 156 includes a sub-field 158 for specifying the video source, e.g. V1; a sub-field 160 for the raster plane, e.g. R; a sub-field 162 for the overlay plane, i.e. 0; a sub-field 164 for the time of day clock, i.e. C; and a sub-field 166 for the product definition name, e.g. 0102. In the case of an "#include" command, the parameter field 156 contains the name of a file to be included, e.g. "mprev100aov.seq" as shown in FIG. 10.

The objects 100 to be displayed by the sequencer 76 can be displayed either on the raster plane and/or on the overlay plane of the graphics image as will be understood by those skilled in the art. The two sub-fields 160,162 define which planes are to be used.

The raster display task 78 receives messages from the sequencer 76 and performs the operations necessary for display on the "raster plane". The raster display task 78 includes a product definition file 82 which tells the raster task 78 what layers comprise the image to be displayed on the raster plane. FIG. 11 shows eight examples of product definitions 168 to 182. The first line, i.e. 00, of each product definition contains the product definition number, for example "0102" for product definition 174. Each line in the definition 174 can also include a description or comment. The remaining lines, i.e. 01, in the definition 174 comprise the layers which together form a composite image to be displayed on the raster plane. Each line 01 includes a file name, e.g. SL231,TGA which contains the data for the layer. The files can include data which was received from the communication controller 4 through the object stream 99. The raster task 78 reads the data from the files, e.g. SL231, TGA, associated with the product from disk 74 and sends it to the graphics display board 26. The product definition 174 also includes a parameter field 175 which provides additional information for processing the layer. For example, the parameter field 175 can specify whether an layer is to be decompressed in OPAQUE or TRANSPARENT form. Unlike known systems, the receiver 10 according to the present invention has no capability to generate graphics, e.g. line, shape or text drawing. According to the invention, the images are built from a series of layers which are decompressed on the graphics display board 26.

In the event that there is fault with the required image, the raster task 78 includes the capability to display a default slide or image. This can be specified in the technical parameter field 175.

The overlay display task 80 receives messages from the sequencer task 76 and handles the display in the "overlay plane". The overlay task 80 also includes a product definition file 84 stored on disk. In response to commands from the sequencer 76, the overlay task 80 assembles the layers comprising the image according to the product definition 84 and passes the compressed data to the graphics display board 26 through the graphics driver module 61. The actual display and presentation of the objects is provided by the graphics board 26 under the control of the graphics board software 60.

As described above, the sequencer 76 performs the actions described by issuing a sequence of instructions to the graphics display board 26 through the raster task 78 and the overlay task 80 according to the sequence list 77. The sequence 77 includes a series of "#include" files which can contain other include or display instructions.

In operation, the sequencer 76 sequences through a list of display operations while keeping in synchronization with the internal clock generated by the heartbeat module 62. As required, the sequencer 59 sends messages to the raster and overlay tasks 78, 80 which prepare the desired images, i.e. products, for display by the graphics display board 26. The sequencer 76 also includes the capability to operate under exception conditions. The exception conditions include loss of synchronization with the communication controller 4; loss of Genlock; or a sequence file lis missing. The exception condition can also include a special warning or advisory which is issued by the communication controller 4 for a particular service, e.g. weather service.

The receiver 10 according to the present invention operates as a "slide machine" and the end result of the service module 58 is to produce a video output and/or audio signal output for the service (e.g. headline news), which can be retransmitted by the cable television station 18 to the households 20 in the cable network 16.

Although various preferred embodiments of the present invention have been described in detail, it will be appreciated by those skilled in the art, that variations may be made without departing from the scope of the appended claims.

I claim:

1. A communication system comprising: a transmitter having means for transmitting an object stream comprising a plurality of objects; each of said objects having an identifier or ID which is unique in said communication system and which is independent of the time of transmission of said object; a plurality of receivers each including means for receiving said object stream, and each including means for selecting any of said objects from said object stream; means for providing a receiver profile at each of said receivers independently from said object stream transmission, said transmitter having no means for addressing any of said objects to any of said receivers; each of said receiver profiles comprising a list of objects of interest for one of said receivers said means for selecting being responsive to said profile and said unique ID for selecting objects from said object stream corresponding to objects of interest and for storing said objects of interest; characterized in that said system includes sequencer means for providing a sequence list; said sequence list providing a list of objects of interest which have been stored to be displayed and their respective start times; and means responsive to said sequencer means for assembling, for display as a video signal said objects on said sequence list, in order of their start times.

2. The communication system as claimed in claim 1 characterized in that there is a cross referencer having a cross reference table for renaming each object which has been selected and stored with an internal identifier or ID.

3. The communication system as claimed in claim 2, characterized in that said sequence list (77) includes the end time (154) for the display of each selected object (100).

4. The communication system as claimed in claim 3 and being a television system, characterized in that said sequence list includes instructions (160, 162) for determining whether an object (100) will be displayed on an overlay plane or on a raster plane.

5. The communication system as claimed in any of claims 1–4, wherein said means for providing a receiver profile at each of said receivers comprises a diskette.

6. The communications system as claimed in any of claims 1–4 wherein said object stream (99) includes data objects (100) associated with a weather forecast service.

7. The communication system as claimed in any of claims 1–4 wherein said object stream (99) includes data objects (100) associated with a headline news service.

8. The communication system as claimed in any of claims 1–4 wherein said object stream (99) includes data objects (100) associated with a sports headline service.

9. The communication system as claimed in any of claims 1–4 wherein said object stream (99) includes data objects (100) associated with a financial market reporting service.

10. The communication system as claimed in any of claims 1–4 and in which at least some of said objects (100) include a time stamp (110), characterized in that there are means for reading said time stamp (110) and for replacing in storage (74) an object (100) having an older time stamp (110) with an object having the same ID (108) but having a more recent time stamp (110).

11. The communication system as claimed in claim 1 wherein each of said receivers includes means for decompressing the data portion of said objects and means for building an image by overlaying layers on a raster plane and on an overlay plane.

* * * * *